B. KUHNS & C. SCHOLZ.
SEED-CUPS FOR GRAIN-DRILLS.
No. 176,966. Patented May 2, 1876.
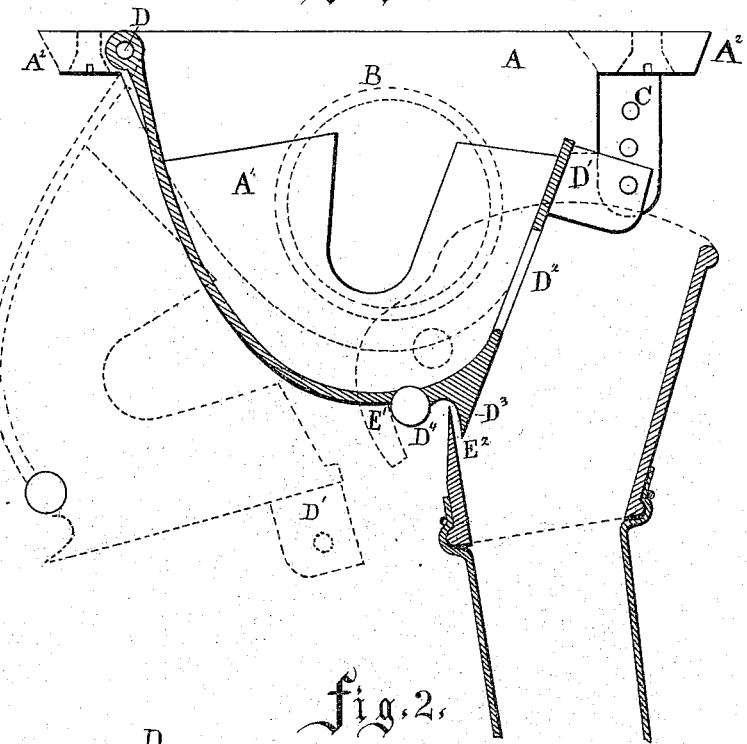
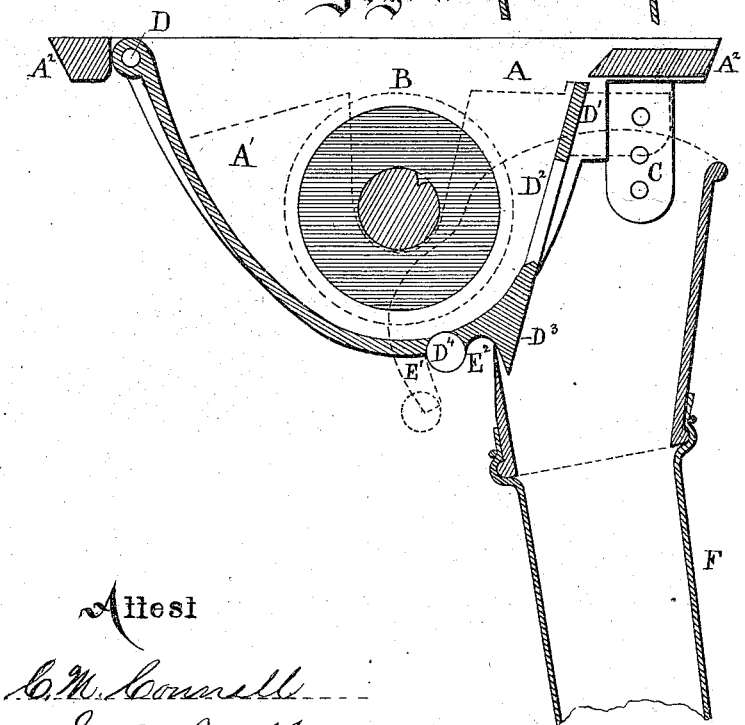
Attest
C. M. Connell
E. A. Bulley
Inventor
Benj. Kuhns
Chas. Scholz
Per Blanchard & Singleton

UNITED STATES PATENT OFFICE.

BENJAMIN KUHNS AND CHARLES SCHOLZ, OF DAYTON, OHIO, ASSIGNORS TO THE FARMERS' FRIEND MANUFACTURING COMPANY, OF SAME PLACE.

IMPROVEMENT IN SEED-CUPS FOR GRAIN-DRILLS.

Specification forming part of Letters Patent No. 176,966, dated May 2, 1876; application filed December 30, 1875.

*To all whom it may concern:*

Be it known that we, BENJAMIN KUHNS and CHARLES SCHOLZ, of Dayton, in the county of Montgomery and State of Ohio, have invented certain new and useful Improvements in Seed-Cups and their Attachments for Grain-Drills; and we do hereby declare that the following is a full, clear, and exact description thereof, which will enable others skilled in the art to which it pertains to make and use the same, reference being had to the accompanying drawings, and to the letters of reference marked thereon, which form a part of this specification—

Figure 1 being a sectional elevation of our seed-cup, showing the adjustable portion in one of its working positions in full lines, and in its most depressed position in dotted lines; it also shows the feed-wheel in dotted lines, the outlet-aperture for the grain and the grain-conductor in position for use, and the devices for preventing it from being detached from the cup; and Fig. 2 is a sectional elevation, showing the adjustable portion of the seed-cup in its most elevated position for use, the seed-wheel in section, and the grain-conductor in position.

Corresponding letters denote like parts in both figures.

This invention relates to seed-cups for grain-drills and to their attachments; and it consists in providing such cups with an adjustable internal cup, which is capable of being more or less elevated, so that it may be made to regulate the quantity of grain sown upon a given area of ground, and so that grains of different sizes, such as wheat, oats, corn, and other kinds, may be sown by the same machine without any other change than the adjustment of the interior seed-cups; and it further consists in the combination with the cups of certain other parts, as will be more fully described hereinafter.

The importance of such a construction and arrangement of the cups of a grain-drill as will enable the operator to control the delivery of grain of different sizes therefrom will be readily understood; and the object of this invention is the production of such a result, in the accomplishment of which we construct a cup, A, which consists of two vertical plates, $A^1$, the upper portions of which are united by bars $A^2$, by means of which they are secured to the grain-hopper of the drill, as shown in Fig. 1, said plates being slotted, so that the shaft which carries the feed-wheels B may pass through them. Upon one of the bars which unite the plates there are formed two ears, C, which are provided with holes for the insertion of a pin, which is made to pass through them and through a projection formed upon the adjustable cup, soon to be described, in order that its position with reference to the stationary one may be adjusted and held in the desired position. Instead of the ears C upon the outer cup, there may be a projecting rod or bolt, with a screw-thread formed thereon, and the lug on the interior cup may be changed from a vertical to a horizontal position, and said rod or bolt made to pass through it, and be supplied with nuts above and below said projection, by which the position of the interior cup can be nicely adjusted. The interior cup above referred to is hinged at D to the outer one, it being provided with sides to prevent the grain from overflowing, and with a projection, $D^1$, by means of which its free end is connected to and made adjustable within the projections C upon the feed-cup. The dotted lines in Fig. 1 show the interior cup in its most depressed condition, which position it is allowed to assume when it becomes necessary to clean it or to remove the feed-wheel from the fixed cup—the full lines in the same figure showing it in its lowest working position, or as used when corn and other large seeds are being sown, while in Fig. 2 it is shown as in its most elevated working position, or as used when wheat or other small grains are to be passed through it; it being apparent that the changes referred to are necessary to adapt it to the distribution of different kinds of grain. The front plate of the interior and swinging cup is provided with an aperture, $D^2$, through which the grain is carried to the conductor; it is also provided with a downwardly-projecting lip or plate, $D^3$, in rear of which there is a groove for the reception of a projection formed upon the grain-conductor, soon to be described, while upon the bottom thereof there is placed a bar, $D^4$, which extends across the same and beyond the sides thereof far enough to receive and support the conductor. The device which receives the grain from the cup and conducts it to the hoes consists of an iron cap, E, having an open upper end for the reception of the grain, and being provided with two hooks, $E^1 E^1$, which pass over the bar $D^4$, and secure the conductor to the swinging cup. Upon that side of cap E upon which the hooks are placed there is formed a beveled projection, $E^2$, which, when the parts are in position for use, passes behind or under the lip or projection $D^3$ upon the swinging cup, and thus prevents the conductor from being disengaged when in use, it being possible to remove it only when it is turned into a nearly horizontal position. The lower end of the cap E is provided with an annular projection, for the purpose of facilitating the attachment of a flexible hose, F, which forms a portion of the grain-conductor. It will be apparent that, as a result of the above-described construction and combination of the parts described, any one or all of the feed-wheels can be removed and replaced without disturbing the other parts of the machine, as it is only necessary to remove the shaft which carries such wheels, and to drop the swinging cup to the position shown in dotted lines in Fig. 1, in order to effect such a result.

Having thus described our invention, what we claim, and desire to secure by Letters Patent, is—

1. A cup for grain-drills, consisting of an outer and an inner portion, the inner part being pivoted to the outer one, as described, and provided with a feed-aperture and a lip or plate, for preventing the detachment therefrom of the grain-conductor when in use, substantially as and for the purpose set forth.

2. The combination of the interior cup, having a feed-orifice and a projecting lip or plate, as described, and the conductor for guiding the grain to the hose, substantially as set forth.

3. The combination of the swinging cup and the perforated projections C C upon the stationary portion A, for adjusting said swinging portion so as to adapt it for the passage of grains of different sizes, substantially as and for the purpose set forth.

4. The arrangement of the swinging cup with reference to the stationary one, whereby it is made to admit of the removal of the seed-wheels, substantially as set forth.

In testimony that we claim the foregoing as our own invention we affix our signatures in presence of two witnesses.

BENJAMIN KUHNS.
CHARLES SCHOLZ.

Witnesses:
GEO. M. YOUNG,
CHARLES J. McKEE.